Nov. 2, 1926.  
R. H. LAWSON  
1,605,896  
METHOD OF AND MEANS FOR EFFECTING REVERSE PLATING  
Filed May 11 1926    10 Sheets-Sheet 1

Inventor:  
Robert H. Lawson,  
Emery, Booth, Janney and Varney  
Attys.

Nov. 2, 1926.  
R. H. LAWSON  
1,605,896  
METHOD OF AND MEANS FOR EFFECTING REVERSE PLATING  
Filed May 11 1926  10 Sheets-Sheet 2

Fig. 3.

Inventor:  
Robert H. Lawson,  
by Emery, Booth, Janney and Varney  
Attys

Nov. 2, 1926.

R. H. LAWSON 1,605,896

METHOD OF AND MEANS FOR EFFECTING REVERSE PLATING

Filed May 11, 1926    10 Sheets-Sheet 7

Nov. 2, 1926.
R. H. LAWSON
1,605,896

METHOD OF AND MEANS FOR EFFECTING REVERSE PLATING

Filed May 11, 1926     10 Sheets-Sheet 8

Nov. 2, 1926.　　　　　　　　　　　　　　　　1,605,896
R. H. LAWSON
METHOD OF AND MEANS FOR EFFECTING REVERSE PLATING
Filed May 11, 1926　　　10 Sheets-Sheet 9

Inventor:
Robert H. Lawson,
By Emery, Booth, Janney and Varney
Attys.

Nov. 2, 1926.  1,605,896
R. H. LAWSON
METHOD OF AND MEANS FOR EFFECTING REVERSE PLATING
Filed May 11, 1926    10 Sheets-Sheet 10

Inventor:
Robert H. Lawson
by Emery, Booth, Janney and Varney
Attys

Patented Nov. 2, 1926.

1,605,896

UNITED STATES PATENT OFFICE.

ROBERT H. LAWSON, OF PAWTUCKET, RHODE ISLAND, ASSIGNOR TO HEMPHILL COMPANY, OF CENTRAL FALLS, RHODE ISLAND, A CORPORATION OF MASSACHUSETTS.

METHOD OF AND MEANS FOR EFFECTING REVERSE PLATING.

Application filed May 11, 1926. Serial No. 108,284.

This invention relates to means for effecting reverse plating, and to the method whereby the product is produced.

In order that the principle of my invention may be more readily understood, I have disclosed a single embodiment of means of my invention and whereby the method of my invention may be practiced and the resulting product or article of my invention produced. I have also disclosed means whereby through the operation of similar instrumentalities I may produce open sinker loop fabrics, such instrumentalities being employed in an organization which otherwise may closely approximate the mechanism by which the reverse plating is effected.

In the drawings:—

Fig. 1 is a side elevation of a stocking such for example as a sport stocking made in accordance with my invention;

Fig. 1ª is a detail showing a portion only of a stocking wherein the lines of reverse plating do not cross as in Fig. 1;

Fig. 2 is a greatly enlarged detail of the fabric illustrated in Fig. 1;

Fig. 4 is a plan view showing the knitting head and the pattern disks geared to the knitting organization and controlling the instrumentalities whereby the reverse plating is effected;

Fig. 4ª is a detail showing a slight modification to be hereafter referred to;

Figures 1, 1A, 2:
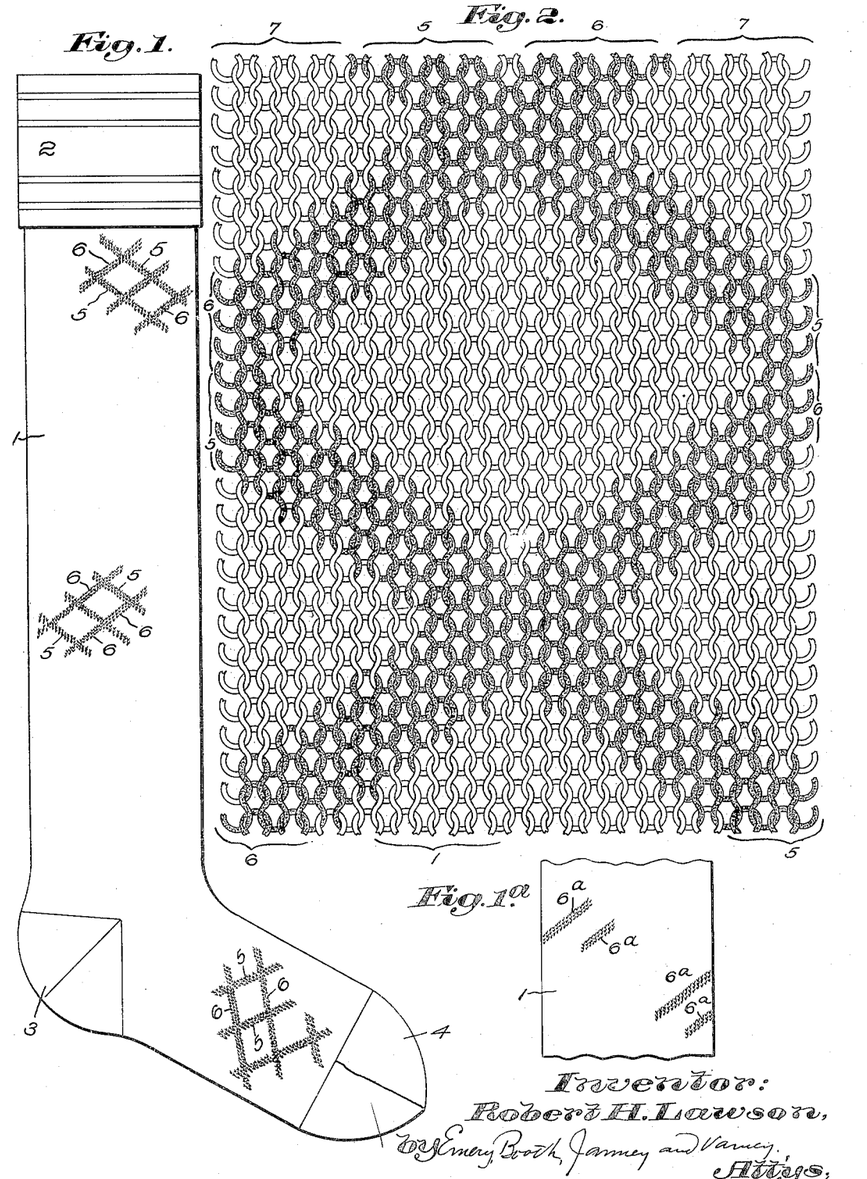

In my application Serial No. 107,921, filed May 10, 1926, I disclosed means for effecting reverse plating by the action of casting off mechanism, and thereby I effected striping extending lengthwise the hosiery or other knitted article. In the present application, I have disclosed means for effecting reverse plating through the action of special instrumentalities which in the disclosed embodiment of the invention are associated with web holders or like members and with the needles, and I provide means for shifting or altering during the knitting operation the point or points at which the reverse plating is effected. By this means I am enabled to make various patterns only one of which I have herein disclosed. The disclosed pattern is characterized by inclined lines of reverse plating which may all extend in the same direction along parallel lines as in Fig. 1ª or may be so arranged as to cross each other so as to produce diamond or like effects. Such pattern, however, is shown only as a single one of many that may be made in accordance with my invention and comprehended within the scope thereof.

I am aware that it has been proposed to effect reverse plating along inclined lines by the control of two thread guides, an instance whereof is the patent to W. D. Huse, No. 271,071, dated January 23, 1883. My invention is sharply contrasted therewith in that the reverse plating is effected not by relative movement of the two yarn guides for introducing the two threads, but by special instrumentalities desirably one for each needle, which co-act therewith in the stitch forming operation in a manner to be hereinafter more fully disclosed.

In the disclosed embodiment of my invention each instrumentality is controlled or subject to control by pattern mechanism, so that according to the dictates of the pattern mechanism reverse plating may be effected at any needle. If called for by the pattern mechanism, there may be a change by progression, recession or otherwise in the point or area where the reverse plating is effected, thus giving a large variety of patterns.

In Fig. 1, have represented a sport stocking such for example as a golf stocking, it having a leg 1 provided with an upper turned over portion 2, a heel 3 made by narrowing and widening, and a toe 4 similarly made. The stocking is desirably formed upon a rotary machine, such for example as the so-called Banner machine, one form of which is disclosed in the patent to Joshua D. Hemphill, No. 933,443. In said Fig. 1, I have indicated at 5, 5 and 6, 6 oppositely inclined lines or stripes made by reverse plating, and in Fig. 1ª I have represented corresponding inclined lines or stripes 6ª, 6ª. In Fig. 2, I have represented upon a much enlarged scale the oppositely inclined lines 5—5 and 6—6 resulting in diamond or lozenge shaped figures in reverse plating, the adjacent or lighter colored loops 7 indicating normal plating.

Figure 7:
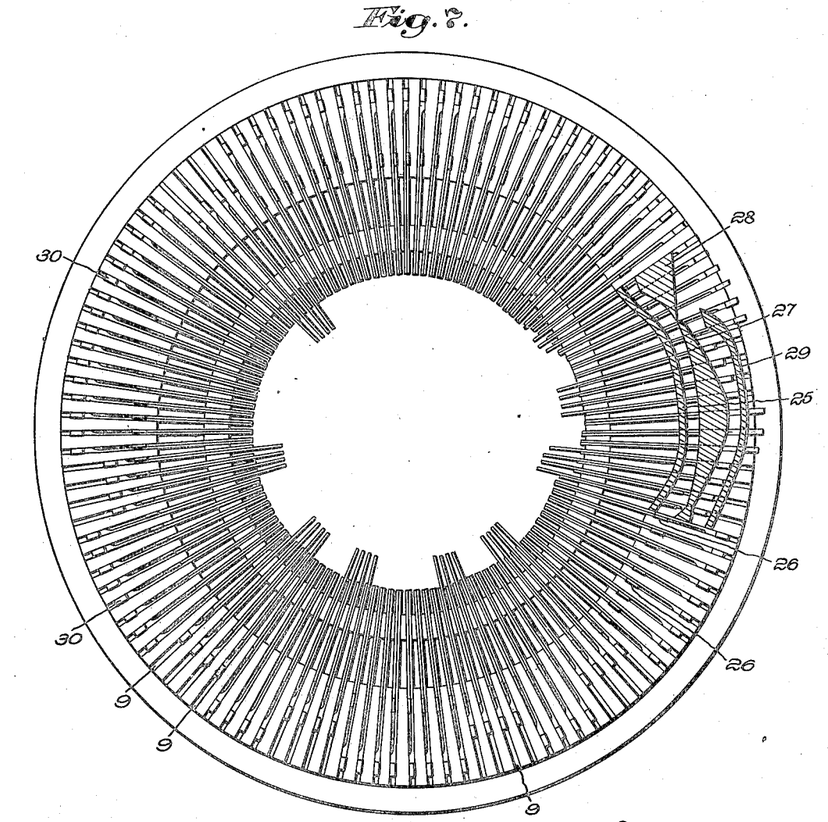
Fig. 7 is a view similar to Fig. 5, but with the cap ring removed and the cams partly shown in horizontal section.
Figure 8:
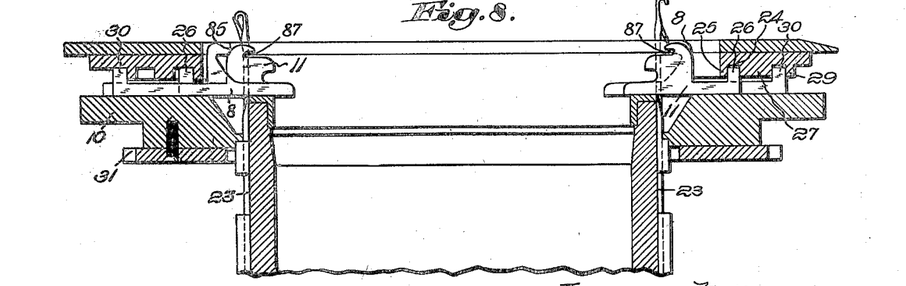
Fig. 8 is a central vertical section of the construction shown in Fig. 7.

In the practice of my invention, I provide desirably a special instrumentality for each needle, and these instrumentalities, one form of which is indicated at 8, are placed one in each groove 9 of the web holder bed ring 10, as shown most clearly in Figs. 7 and 8.

Desirably I place said instrumentalities in the same grooves as the web holders 11, or sinkers as they are sometimes termed. The instrumentalities 8 do not function as web holders or sinkers, though under certain conditions it might be possible to run the machine in such a way as to give said instrumentalities a web-holding function. I have obtained the best results, however, by providing special instrumentalities which are distinct from the web holders or sinkers, but positioning them each in a groove with the web holder or sinker for that needle.

Figure 9:
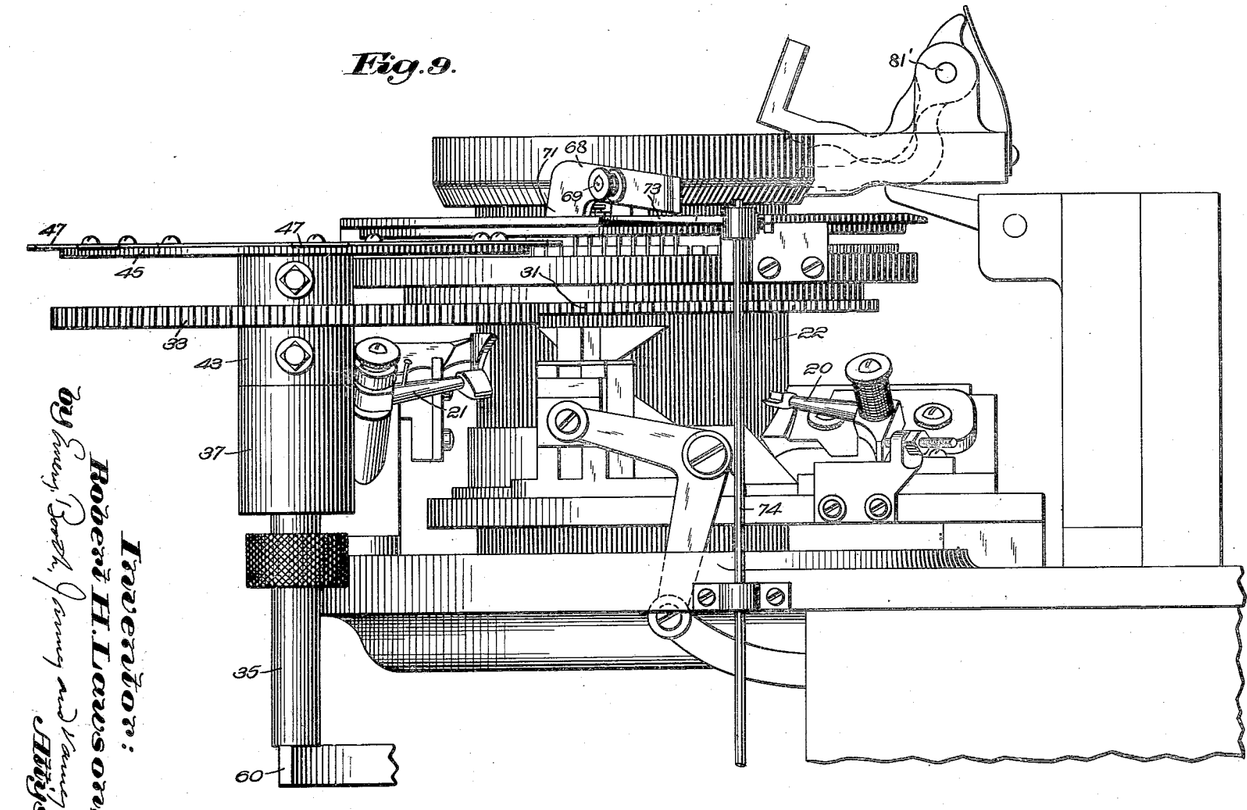
Fig. 9 is a front elevation of the upper portion of the knitting machine and showing the knitting head and the parts immediately associated therewith in the practice of my invention.
Figure 10:
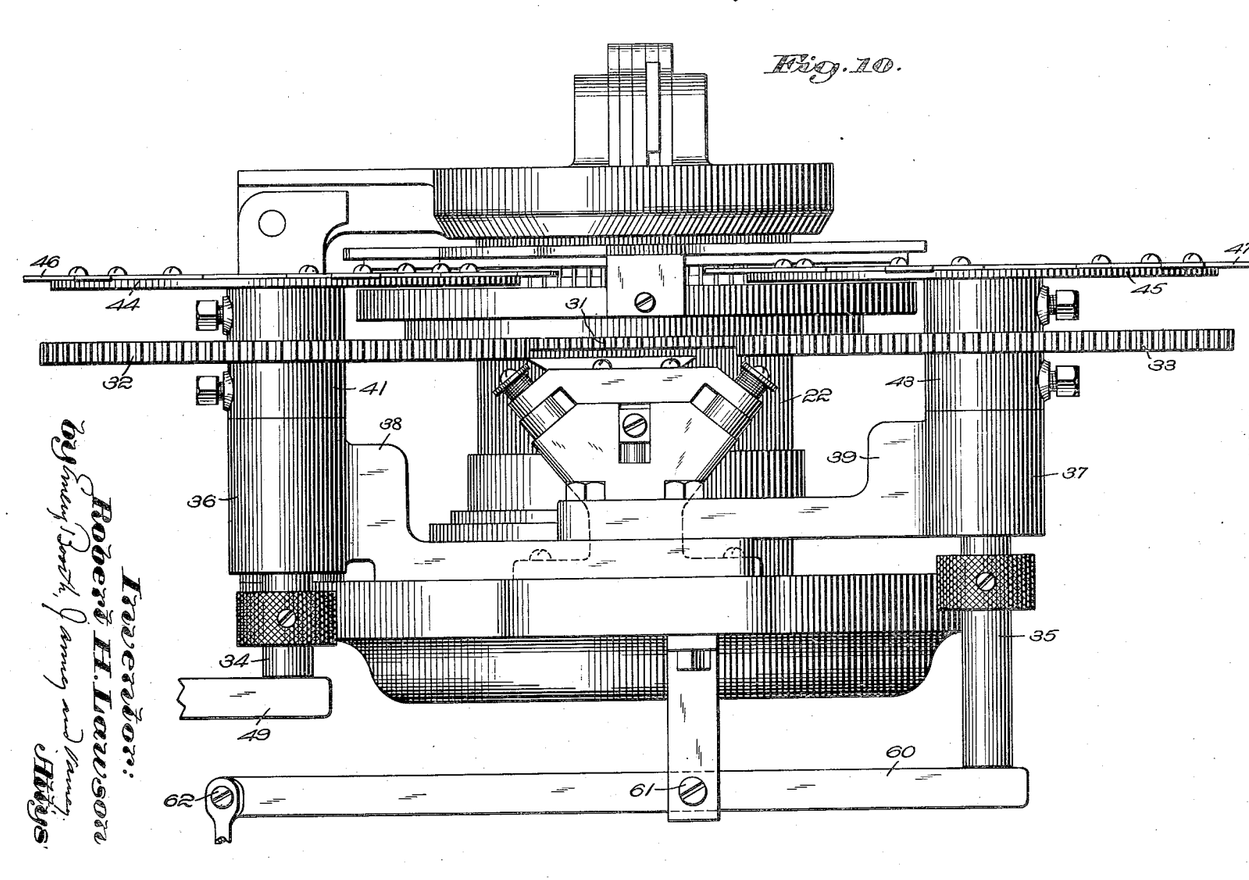
Fig. 10 is an end elevation of the head of the knitting machine and indicating the manner in which the pattern disks are driven from the knitting organization.

The machine herein shown as one upon which my invention may be practiced need not be specifically described inasmuch as it is the well known Banner or Hemphill machine. Referring briefly, however, to Figs. 3 to 10 inclusive, it is to be noted that the machine is of the independent needle type, and the needles are desirably latch needles. Therefore, I employ a latch ring 12 equipped with suitable binder mechanism generally indicated at 13 and controlled by link and lever mechanism generally indicated at 14 and which need not be further described otherwise than to state that the same is controlled from the pattern cylinder. The entire mechanism is driven from the main drive shaft 15 having thereon the usual pulleys and also suitable gearing including the pinion 16 for driving the large gear 17 (known in the art as the 104 gear) and which is mounted upon the shaft 18. From said main drive shaft is also driven in usual manner a quadrant 19 pivoted at 19', whereby the machine is reciprocated during the knitting of the heel and toe. The mechanism is also provided with the usual narrowing pickers and the usual widening pickers, one each of which is indicated at 20 and 21 respectively, see particularly Fig. 9. These pickers are desirably those of the said Banner machine and require no further description. The needle cylinder 22, as shown most clearly in Figs. 9 and 10, is provided with the usual needle grooves wherein are mounted latch needles 23. At the upper end of the needle cylinder is provided the usual web holder bed ring 10 having formed in its upper surface as usual radial grooves 9 which as stated receive in this embodiment of my invention not only the web holders or so-called sinkers 11 but the special instrumentalities 8. Said elements 8 and 11 are wholly disconnected from each other and are capable of independent radial movement in said grooves and are reciprocated therein by certain cams that will be particularly described. The cap ring 24 is provided and excepted as hereinafter pointed out the bed ring 10 and said cap ring 24 are or may be of usual construction.

As shown most clearly in Fig. 7, an inner circumferentially extending cam 25, here shown only in part, is provided to act upon the butts 26 of the web holders 11, and radially outside thereof are provided (but shown only in part) circumferentially extending cams 27, 28 and radially outside thereof a cam 29 to act upon the butts 30 of the special instrumentalities 8, so as in the relative rotation or movement of the needle cylinder and cam ring to move the said web holders and special instrumentalities in and out. I provide pattern means of any suitable type, a simple form of which is herein shown, to move the special instrumentalities 8, and herein, radially inward so as to bring them within the control of the proper cams of the cap ring. When the special instrumentalities 8 are moved inward by the cams of the cap ring they so engage the proper yarn of the two yarns being fed in normal plating relation, as to reverse the plating, but if not so moved radially inward then normal plating continues, or is effected at the needles pertaining to such special instrumentalities. The pattern means may be of such type as will permit every needle, or every needle of a predetermined series, to have reverse plating effected thereon. While in no sense limiting myself thereto, I will describe a simple form of pattern mechanism, although obviously many other types or forms of pattern mechanism may be provided within the scope of my invention.

Desirably I employ a part or parts which rotates with the rotating part of the knitting organization. Assuming for purpose of description merely that the needle cylinder is to be rotated, it is evident that the rotating part might mesh with the needles so that in the movement of the mechanism the proper relation may be preserved. I find it, however, more effective to provide teeth upon either the sinker cam ring or the needle cylinder, and herein I have chosen to provide teeth 31 upon the sinker cam ring and extending entirely about the same. Meshing therewith I provide one or, as herein shown, a plurality of gears 32, 33 respectively fast for rotating movement upon spindles 34, 35 received in bearings 36, 37, formed or carried upon brackets 38, 39 mounted upon the bed plate of the machine. The teeth of said gears 32, 33 are desirably of greater height than are the teeth 31 with which they mesh, since in the disclosed embodiment of my invention I provide for removing the pattern disk or disks out of engagement with some at least of the butts of the special instrumentalities 8 without disengaging the gears 32, 33 from the teeth 31. The number of teeth 31 for best results is equal to that of the needles of the machine, but might be of some number bearing some other fixed ratio to the number of needles, as, for example, one-third or one-half.

Figures 4, 4A:
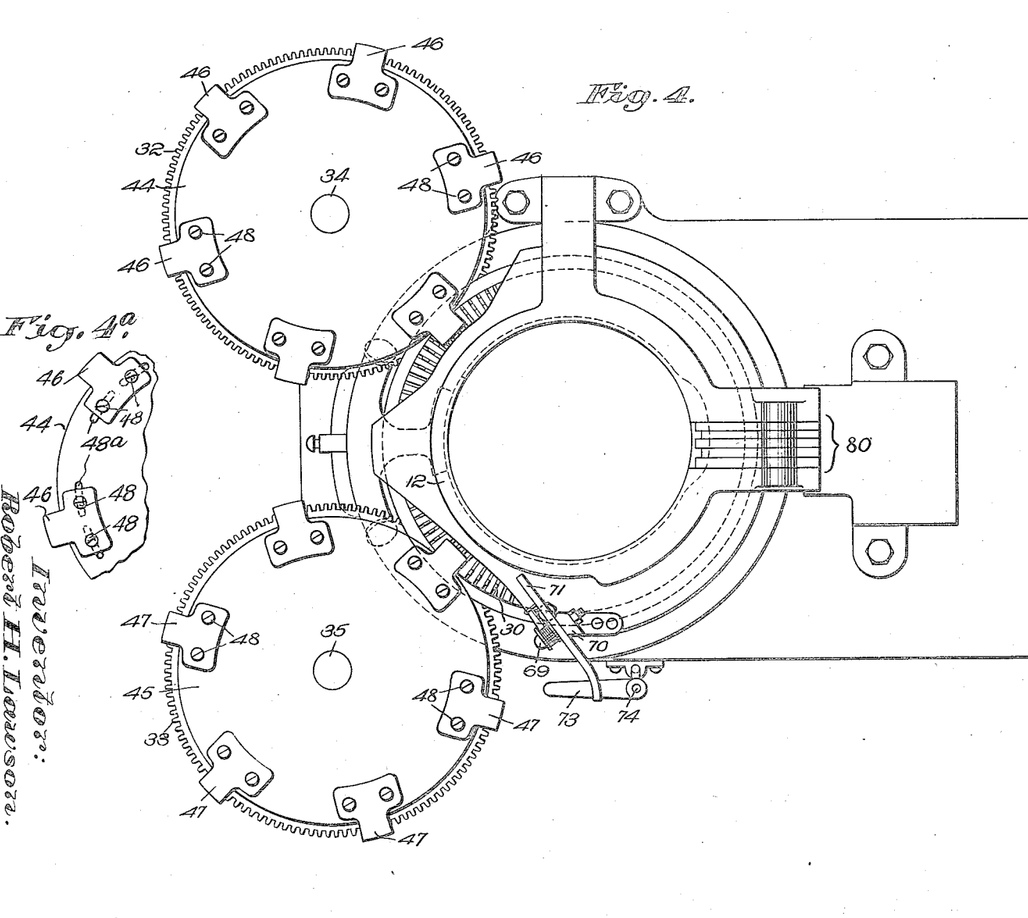

Upon the spindles 34, 35 are fast the collars 40, 41 and 42, 43 respectively, and fast upon the upper end of the spindles 34, 35 are the pattern disks 44, 45 respectively. As shown most clearly in Fig. 4, said pattern disks 44, 45 are provided at circumferentially spaced points with the members 46, 47 respectively, here shown as secured in place by screws 48. In practice I may provide means whereby the members 46, 47 may be readily shifted to or applied at other points circumferentially of the disks 44, 45. This I may accomplish in any suitable manner. Herein for the pupose I have represented circumferentially extending slots 48$^a$ to receive the screws 48, as shown in the modification, Fig. 4$^a$.

Figure 11:
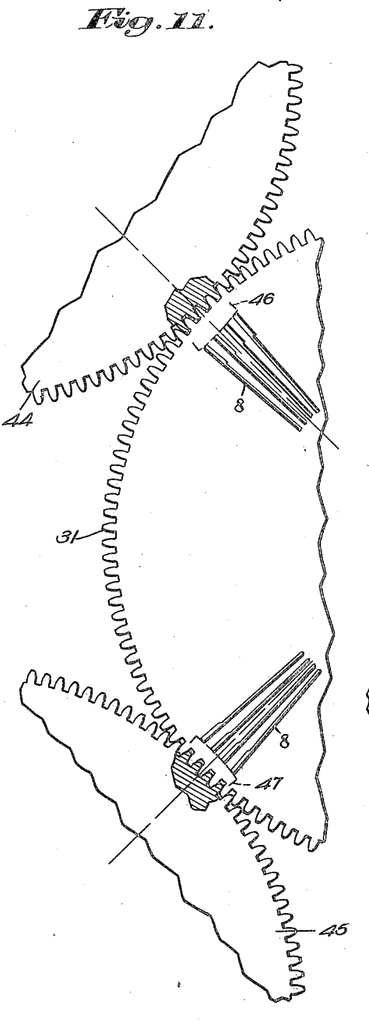
Figs. 11 and 12 are details in plan with parts broken away disclosing the geared relation of the pattern disks with the knitting organization.
Figure 12:
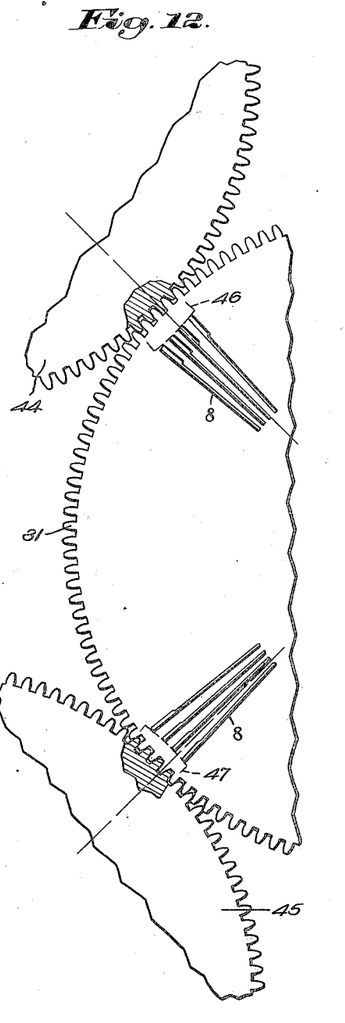
Figure 13:
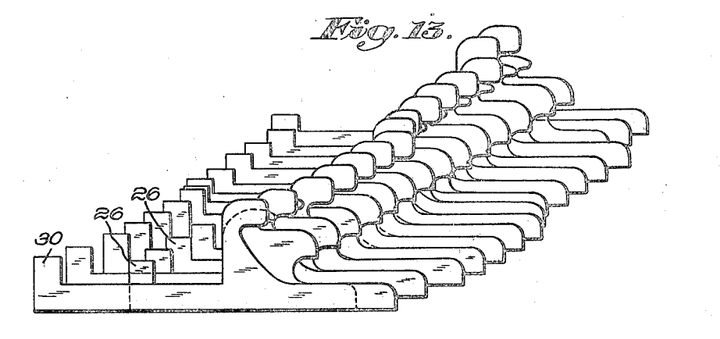
Fig. 13 is a perspective view of a few of the web holders and special instrumentalities for reverse plating sequentially arranged.

The number of teeth upon the disk or disks 32, 33 is determined as follows in this embodiment of my invention, it being noted that if two or more disks all having the same number of teeth are provided, there would be a mere duplication in function. Assuming first that a single disk only is provided, as for example in producing stripes all extending in the same direction, if the number of teeth on the disk is equal to or divisible into the number of teeth on the sinker cam ring or other toothed driving part, the stripes or reverse plating will extend parallel to the wales of the fabric. If the number of teeth on the disk be not equal to or divisible into the number of teeth on the driving part, the plating stripes will be sloping, that is, they will cross wales. If two disks be employed, and the number of teeth thereon differ with respect to each other, and the number of teeth on neither disk is the same as or divisible into the number of teeth on the driving part, then different effects are secured. For example, if as shown in Figs. 11, 12, the number of teeth 31 upon the rotating parts be 120 and the number of teeth upon the disk 44 be 119 and the number of teeth upon the disk 45 be 121, the constant rotation of the disk 44 results in what may be termed an incremental gain, and the constant rotation of the disk 45 results in what may be termed an incremental loss in the position of the reverse plating stripes produced or controlled thereby. That is to say, viewing Figs. 1 and 2, and assuming that the direction of turning movement of the fabric is toward the right viewing said figures the stripes 5 represent a constant incremental loss and the stripes 6 a constant incremental gain as to the needles upon which such reverse plating is effected.

An important purpose in having a constant mesh or driving relation between the gear or gears for the pattern disk or disks and the rotating element is that if a stocking be knitted, it is desirable to provide for throwing the reverse plating mechanism out of operation during the formation of the heel and toe. If the plating disks 44, 45, or the single disk, if one only were provided, were removed from the functioning relation without retaining the meshing relation of the teeth, the parts could not readily be restored to action without impairing the pattern. If, however, the fabric being produced is something other than a stocking, or considering only the leg or foot of the stocking, it would not be necessary to provide means to throw the pattern disk or disks into non-functioning position. If desired, one of the disks only may be rendered active at certain times,—assuming that two or more disks are provided.

The special instrumentalities 8 are provided as stated with butts 30 and desirably one-half or substantially one-half of these butts are long butts and the remainder are short butts, these corresponding in position respectively with the long and short butt needles. In practice, I may provide a somewhat greater number of short butts than of long butts.

I have stated that it is desirable especially in knitting a stocking to provide means for lifting the pattern disk or disks out of engagement with the butts of the special instrumentalities. Desirably this removal is effected by a lifting action and in the disclosed embodiment of my invention I have provided the following means, to which my invention is in no wise limited.

The spindle 34 rests upon a lever 49 pivoted at 50 upon the framing and to which lever is pivotally connected at 51 a link 52, the lower end whereof is pivotally connected at 53 to a lever 54 itself pivoted at 55 and having a toe 56 adapted to rest upon the disk cam 57 mounted upon the pattern drum shaft 58 and provided with suitable circumferentially extending elevations 59. Similarly, the spindle 25 rests upon a lever 60 pivoted at 61 and having pivotally connected at its other end at 62 a link 63 pivotally connected at 64 to a lever 65 pivoted at 55 and having a nose 66 adapted to be engaged with another disk cam upon the pattern shaft 58.

According to the dictates of said pattern cams the disks 44, 45, or either of them, are lifted or depressed. Desirably and for best results, as the pattern disks or either of them are or is lifted out of functioning position when the heel or toe is reached, they are lifted in two steps so as first to lift the members 46 or 47 as the case may be above the short butts only, and then above the long butts of the special instrumentalities 8. In restoring said parts to action, they are desirably dropped back into action in two similar steps.

In practice I provide a special pattern drum which is fast upon the pattern drum shaft 58 and this drum is provided with three cam tracks each controlling its own lever. Two of these levers are the levers 54 and 65, and the third lever is one to be referred to for retracting or effecting the withdrawal of the special instrumentalities 8.

Figure 16:
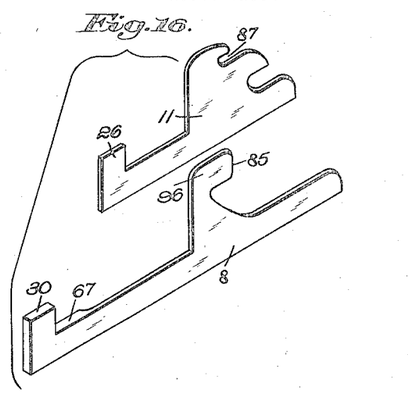
Fig. 16 is a perspective view of one web holder and one special instrumentality, both of which are positioned in a single groove of the web holder bed ring.

Said pattern disks 44, 45 are in the disclosed embodiment of my invention moved out of functioning position when the heel and when the toe are reached, and they are restored to functioning position at the end of the heel and at the end of the toe. Desirably the outer end of each special instrumentality 8 is laterally thickened as indicated at 67 (see Fig. 16), so as entirely to fill in width the grooves 9 as is clearly evident from Fig. 7. This prevents all side motion or wobble of the said special instrumentalities.

Figure 3:
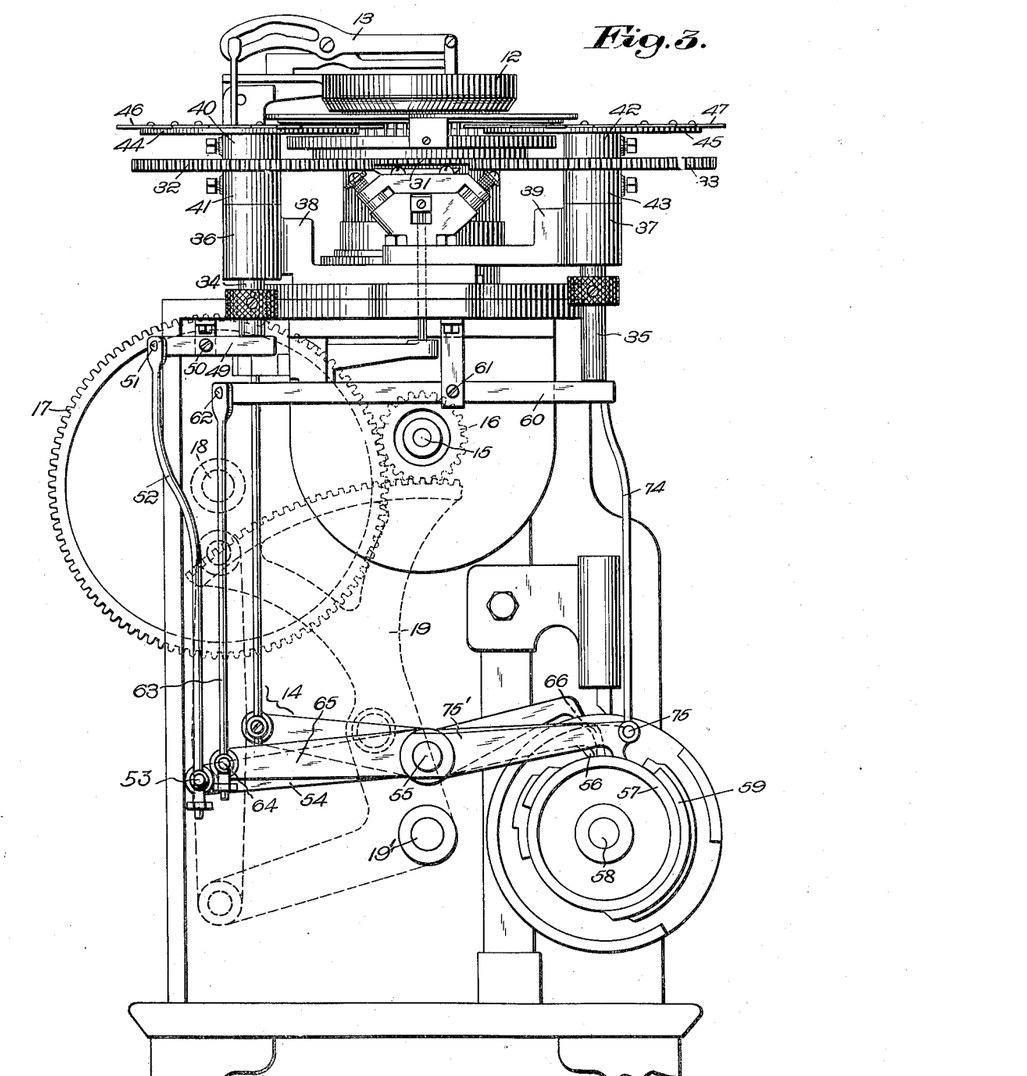
Fig. 3 is an end elevation of a knitting machine having the mechanism of my invention applied thereto and by which my method may be practiced.
Figures 5, 6:
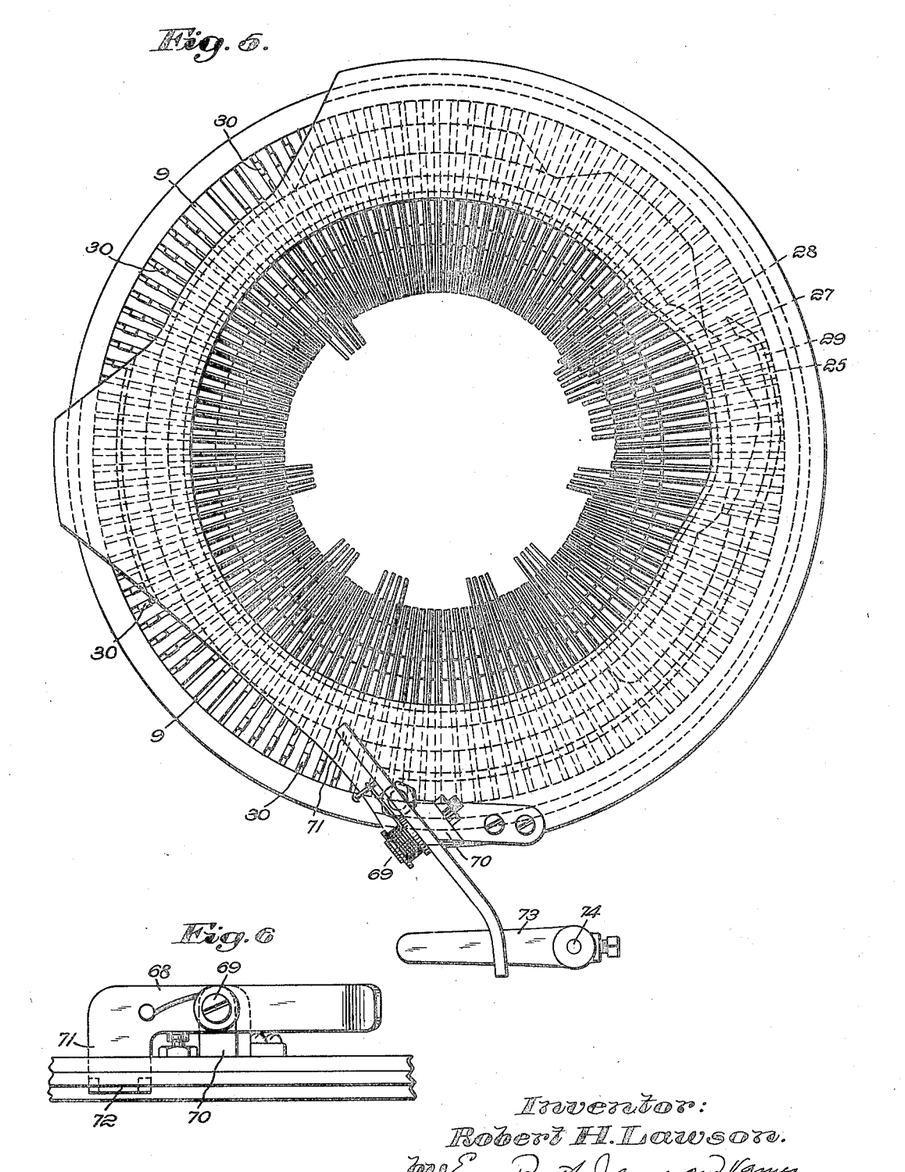
Fig. 5 is a plan view of the knitting head upon a larger scale than in Fig. 4 with the latch ring removed.
Fig. 6 is a detail in side elevation of certain means for positioning the plating controlling instrumentalities at certain times.

Referring particularly to Figs. 5 and 6, I have represented a lever 68 pivoted at 69 upon a suitable bracket 70. This lever extends obliquely with respect to the rotating set of web holders and special instrumentalities, and it is provided with a downwardly extending end 71 having a flat edge 72, which is adapted to engage when moved downwardly, with the long butts of the special instrumentalities 8 so as to cause them by a wedging or cam action to move radially outward. It is unnecessary to cause the edge 72 to engage also the short butts of said special instrumentalities as they in practice are or may be moved out by the proper cam of the sinker head. The said lever 68 is controlled in position by an arm 73 shown most clearly in Figs. 5 and 9, as fast upon an upright rod 74 extending downwardly as indicated in Fig. 3 and pivotally connected at 75 with the nose end of the lever 75', pivoted at 55.

Referring to the fact that I have represented regular web holders 11, it is to be noted that between every two needles there must be some instrument that has a web holding function whether or not said web holding function is secured by a regular web holder. I prefer to have the web holding function performed as herein disclosed. For simplicity of operation, however, I prefer to provide web holders, as 11, each in a groove with its companion special instrumentality 8, but movable independently thereof.

It will be understood from the foregoing description that each special instrumentality 8 is under the control of pattern means which determines whether normal plating or reverse plating shall occur in each course upon the needle pertaining thereto. Depending upon the elaboration of the pattern control the reverse plating may be so changed in position from needle to needle as to result not only in inclined stripes extending in a direction indicating an incremental gain or in a direction indicating an incremental loss, but figures of various sorts and contours may readily be made.

Figure 14:
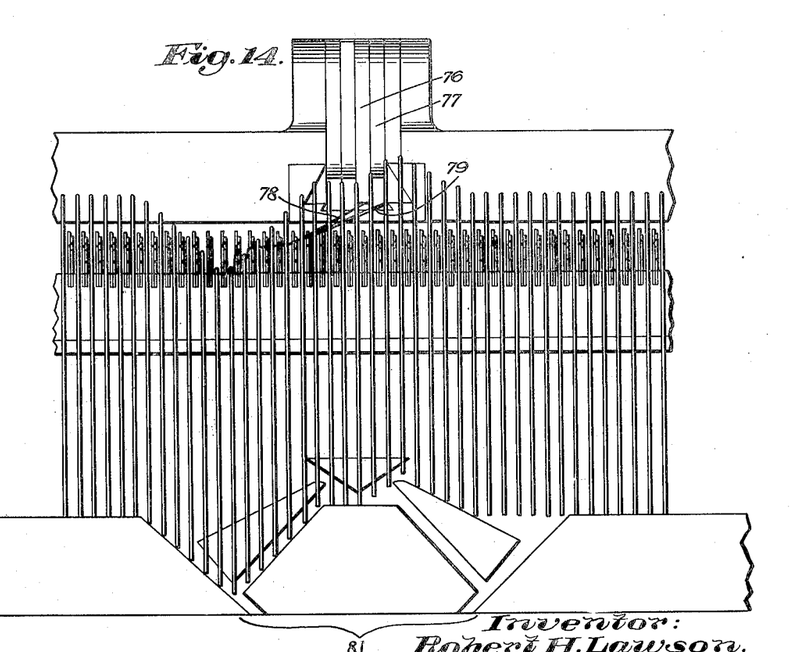
Fig. 14 is a development of a portion of the circle of knitting needles showing the feeding of the yarn or threads thereto and also showing the web holders and special instrumentalities for cooperating in effecting reverse plating.

When the mechanism of my invention is employed to effect or control the plating, that is, to determine when reverse plating is to be accomplished, I provide for the simultaneous feeding of two yarns, namely, the back yarn and the face yarn. Two such yarns are indicated in Fig. 14, where two yarn guides 76, 77 are shown as down in feeding position so as to introduce the two yarns 78, 79. During normal plating, the back yarn appears at the inner face of the fabric, but during reverse plating it is brought or moved into such position through the action of the special instrumentalities 8 that it temporarily becomes the front or face yarn. The yarn guides 76, 77 constitute two of what may be the usual series of yarn guides 80, and the yarns are introduced desirably through the usual throat as indicated in Fig. 14, and the needles are moved in the knitting operation by the usual cams 81, which need not be more particularly described.

The said series of yarn guides 80 are pivoted side by side as indicated at 81' in Fig. 9, and are all under the control of pattern mechanism as in the Banner machine.

It will be understood from the foregoing description that the function of the pattern control, herein exemplified by the disks 44, 45 is to move special instrumentalities 8 inwardly by engagement of the members 46, 47 with the butts thereof, as indicated in Fig. 5 and elsewhere, so as to bring them under the control of the proper cams of the sinker cam ring, thereby to cause said special instrumentalities to engage the back yarn as to move it or cause it to be moved to become temporarily the front or face yarn, and thereby effect reverse plating.

Figure 15:
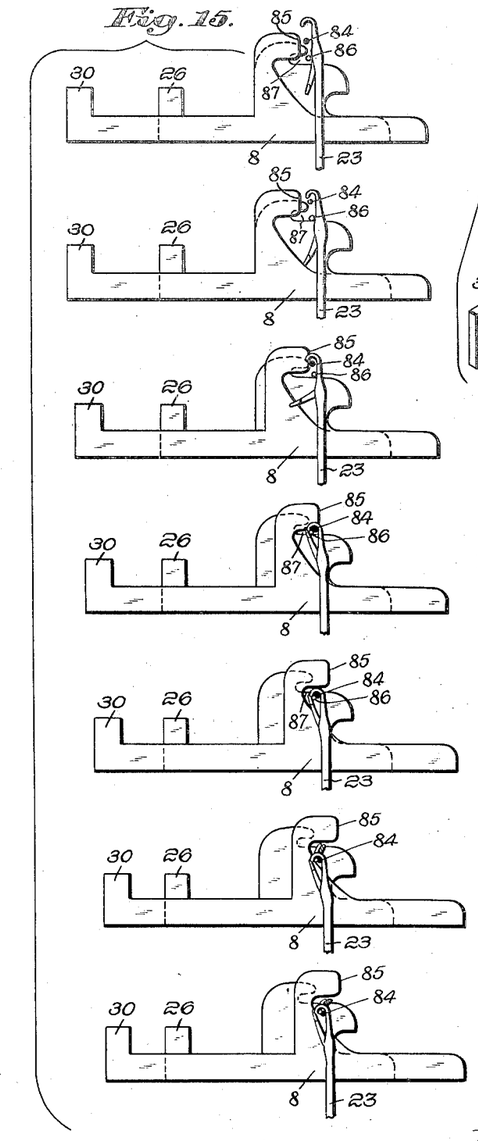
Fig. 15 represents in side elevation a series of different positions assumed by the special instrumentality that cooperates in effecting reverse plating.

In Fig. 15, I have shown seven successive positions of the parts in effecting reverse plating. The thread 84 which is shown as black is the thread which in normal plating appears at the inner face of the fabric. In reverse plating the said black thread is engaged by the upright edge 85 of the special instrumentality 8 and the result is to cause said thread to appear at the outside of the fabric.

The white thread 86 is received within the upper notch 87 of the regular web holder 11 and finds its position in reverse plating at the inner face of the fabric.

Figure 17:
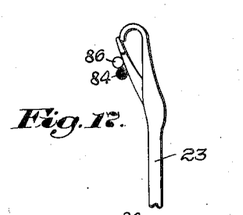
Figs. 17, 18 and 19 are side elevations of a needle and the two threads employed in plating showing successive relative positions assumed by these threads in reverse plating.
Figure 18:
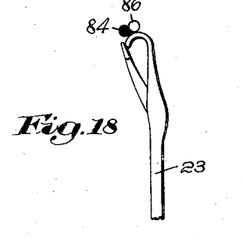
Figure 19:
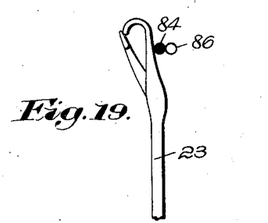

In Figs. 17, 18 and 19, I have represented successive positions of the black thread 84 and the white thread 86 in effecting reverse plating.

Referring again to Fig. 7, it will be evident that I have not there attempted to show throughout their entire circumference the cam paths or formations for the butts of the regular web holders and the special instrumentalities, but have shown sufficient thereof in section to indicate certain of the movements of said parts.

In that form of special instrumentality shown in Figs. 1 to 16, there is provided but the single nib indicated at 96, but it is to be understood that my invention is not restricted to such form.

In accordance with this embodiment of my invention, the upright face 95 of the nib of the special instrumentality 8 engages and pushes the yarn which is to appear at the outer face of the fabric in reverse plating. It is obvious that my invention is not limited to the special shape or form of the instrumentality referred to, nor to the described movement thereof in order to move the yarn as described to appear at the outer face of the fabric. I desirably move the described yarn and in this embodiment of the invention such movement is effected by pushing the said yarn.

In the disclosed embodiment of my invention and wherein the special instrumentalities are each in a groove with a regular web holder, it is to be understood that the direction of rotation of the needle cylinder is such that the special instrumentalities engage the yarn before the regular web holder in the same groove therein. It is to be observed that applicant's invention is embodied or practised in a so-called direct thread measuring knitting machine, i. e., one wherein the length of needle loops is controlled by the thread drawing movement of the needles, as contrasted with a knitting machine wherein instrumentalities such as jack sinkers and dividing sinkers are employed to measure the loops.

Having thus described one embodiment of the mechanism of my invention and one manner of practicing the method thereof, and having disclosed but a single pattern of fabric made in accordance with my invention, it is to be understood that although specific terms are employed they are used in a generic and descriptive sense and not for purposes of limitation, the scope of the invention being set forth in the following claims.

Claims:—

1. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and means selectively governing the transverse movement of said instrumentalties to effect a relative transverse movement of at least one of said threads with respect to the needles, with consequent reversal in position of said threads, whereby, when loop formation by the needles is respectively completed, the back thread will selectively appear at the face of the fabric.

2. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and means selectively governing the transverse movement of said instrumentalities to effect separation of said two threads with relative movement of at least one of said threads with respect to the needles, whereby, when loop formation by the needles is respectively completed, the back thread will selectively appear at the face of the fabric.

3. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and means selectively governing the transverse movement of said instrumentalities to move at least one of said threads transversely with respect to the needle series, so as, when loop formation by the needles is completed, the back thread will selectively appear at the face of the fabric.

4. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and means selectively governing the transverse movement of said instrumentalities to engage and separate said two threads and thereby to effect reversal in position of said threads at selective needles, whereby, when loop formation by the needles is respectively completed, the back thread will selectively appear at the face of the fabric.

5. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and means for selectively moving said instrumentalities transversely of the needle series selectively to reverse the relative position of the face and back threads at one or more selected needles, whereby, when loop formation at the selected needles is respectively completed, the back thread will there appear at the face of the fabric.

6. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and means for selectively moving any of said instrumentalities to effect reversal in position of the back and face threads at the respective needles, whereby, when loop formation by the needles is respectively completed, the back thread will selectively appear at the face of the fabric.

7. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and means for selectively separating the two threads to their relatively desired position in the fabric prior to the descent of the needles, whereby when loop formation by the needles is respectively completed, the back thread will selectively appear at the face of the fabric.

8. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and selective means adapted to cooperate with said thread engaging instrumentalities to effect reverse plating at any single wale of the fabric.

9. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and selective means cooperating with said thread engaging instrumentalities to effect reverse plating at any single needle wale of the fabric 10. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and selective means cooperating with said thread engaging instrumentalities to reverse the position of the said threads at any wale of the fabric.

11. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and means cooperating with said thread engaging instrumentalities completely to change from normal plating to reverse plating at any wale of the fabric at will.

12. Mechanism for effecting plating and reverse plating in a knitted fabric including a series of independent needles, thread engaging instrumentalities for each needle respectively, said instrumentalities being movable individually transversely of the needles series, thread guiding means to feed a back thread and a face thread in plating relation to the needles, and pattern means arranged at one side of the needle series to act upon the thread engaging instrumentalities so as to impart thread separating movement at any needle whereby, when the loop formation by the needles is respectively completed, the back thread selectively appears at the face of the fabric.

13. A circular knitting machine for effecting plating and reverse plating in a knitted fabric including a circular series of independent needles, thread engaging instrumentalities between the needles respectively and individually movable in and out, thread guiding means to feed a back thread and a face thread in plating relation to the needles, and means selectively governing the in and out movement of said thread engaging instrumentalities to effect change from plating to reverse plating at any wale of the fabric at will.

14. A circular knitting machine for effecting plating and reverse plating in a knitted fabric including a circular series of independent needles, thread engaging instrumentalities between the needles respectively and individually movable in and out, thread guiding means to feed a back thread and a face thread in plating relation to the needles, and selective means cooperating with said thread engaging instrumentalities to cause reversal in position of the threads at any wale whereby, when the loop formation by the needles is respectively completed, the back thread will selectively appear at the face of the fabric.

15. A circular knitting machine for effecting plating and reverse plating in a knitted fabric including a circular series of independent needles, thread engaging instrumentalities between the needles respectively and individually movable in and out, thread guiding means to feed a back thread and a face thread in plating relation to the needles, and selective means cooperating with said thread engaging instrumentalities to effect reverse plating at any single needle wale of the fabric.

16. A circular knitting machine for effecting plating and reverse plating in a knitted fabric including a circular series of independent needles, thread engaging instrumentalities between the needles respectively and individually movable in and out, thread guiding means to feed a back thread and a face thread in plating relation to the needles, and means cooperating with said thread engaging instrumentalities selectively to separate the threads radially to their relatively desired position in the fabric prior to the descent of the respective needles.

17. A circular knitting machine for effecting plating and reverse plating in a knitted fabric including a circular series of independent needles, thread engaging instrumentalities between the needles respectively and individually movable in and out, thread guiding means to feed a back thread and a face thread in plating relation to the needles, and means cooperating with said thread engaging instrumentalities for selectively governing their in and out movement to move at least one of said threads radially with respect to the needles so as to reverse their position whereby, when loop formation by the needles is respectively completed, the back thread will selectively appear at the face of the fabric.

18. A direct-thread measuring knitting machine, i. e., wherein the length of needle loops is controlled by the thread drawing movement of the needles, having a series of needles, means for supplying two threads in a plating relation to said series of needles, thread engaging instrumentalities between the needles respectively and individually movable transversely of the needle series, and selective means cooperating with said thread engaging instrumentalities for starting and for stopping reverse plating at will, at any needle of the said series of needles.

19. A direct thread measuring knitting machine, i. e., wherein the length of needle loops is controlled by the thread drawing movement of the needles, having a series of needles, means for supplying two threads in a plating relation to said series of needles, thread engaging instrumentalities between the needles respectively and individually movable transversely of the needle series, and selective means cooperating with said thread engaging instrumentalities for separating the two threads at will at any needle of the series so as, when the loop formation by the needles is respectively completed, reverse plating is effected at will.

20. In a circular hosiery, independent needle, knitting machine, wherein the length of loops is controlled by the thread drawing movement of the needles, a circular series of independent needles, a corresponding series of yarn engaging instrumentalities positioned between the needles and movable in and out, thread guiding means to feed a back thread and a face thread in plating relation to the needles, and selective means cooperating with said thread engaging instrumentalities, whereby reverse plating may be started at will at any needle of the series of needles.

21. In a circular hosiery, independent needle, knitting machine, wherein the length of loops is controlled by the thread drawing movement of the needles, a circular series of independent needles, a corresponding series of thread engaging instrumentalities positioned between the needles and movable in and out, thread guiding means to feed a back thread and a face thread in plating relation to the needles, and selective means cooperating with said thread engaging instrumentalities, whereby reverse plating may be started at will and may be stopped at will at any needle of the series of needles.

22. A circular, independent needle, hosiery machine, having means for making heel and toe pockets by a fashioning operation, a circular series of independent needles, a corresponding series of thread engaging instrumentalities movable in and out between the needles respectively, selective means cooperating with said thread engaging instrumentalities to effect change in the position of the threads and thereby to effect reverse plating at will, and means for rendering said selective means inactive during heel or toe work.

23. A circular, independent needle, hosiery machine, having means for making heel and toe pockets by a fashioning operation, a circular series of independent needles, a corresponding series of thread engaging instrumentalities movable in and out between the needles respectively, selective means cooperating with said thread engaging instrumentalities to effect change in the position of the threads and thereby to effect reverse plating at will, and means whereby said selective means is rendered inactive during fashioning work.

24. A circular knitting machine having a circular series of independent needles, a corresponding series of thread engaging instrumentalities positioned between the needles and movable in and out, thread guiding means to feed a back thread and a face thread in plating relation to the needles, and selective means for causing any of said instrumentalities to engage the back thread and move it into position to become the face thread.

25. A circular knitting machine for effecting plating and reverse plating in a knitted fabric, including a circular series of independent needles, thread engaging instrumentalities between the needles respectively and individually movable in and out, thread guiding means to feed a back thread and a face thread in plating relation to the needles, and a pattern member exterior to the needle circle and adapted to act selectively in controlling the in and out movement of said thread engaging instrumentalities to effect change from plating to reverse plating.

26. A circular knitting machine for effecting plating and reverse plating in a knitted fabric, including a circular series of independent needles, thread engaging instrumentalities between the needles respectively and individually movable in and out, thread guiding means to feed a back thread and a face thread in plating relation to the needles, and a pattern disk acting selectively upon said thread engaging instrumentalities to govern the movement thereof to effect change from plating to reverse plating.

27. A circular knitting machine for effecting plating and reverse plating in a knitted fabric, including a circular series of independent needles, thread engaging instrumentalities between the needles respectively and individually movable in and out, thread guiding means to feed a back thread and a face thread in plating relation to the needles, and a pattern disk having formations to engage and move said instrumentalities, thereby to effect, when loop formation of the needles is completed, a change from normal plating to reverse plating.

28. A circular knitting machine for effecting plating and reverse plating in a knitted fabric, including a circular series of independent needles carried by a rotating member, thread engaging instrumentalities between the needles respectively and individually movable in and out, thread guiding means to feed a back thread and a face thread in plating relation to the needles, and a pattern disk rotating with the needles and adapted to engage predetermined instrumentalities of said series, thereby causing them selectively to move inward and so engage the threads as to effect, when loop formation by the needles is completed, a change from normal plating to reverse plating.

29. A circular knitting machine for effecting plating and reverse plating in a knitted fabric, including a circular series of independent needles, thread engaging instrumentalities between the needles respectively and individually movable in and out, thread guiding means to feed a back thread and a face thread in plating relation to the needles, a pattern disk having formations to engage and move selected instrumentalities of said series to cause them to function in effecting reverse plating.

30. A circular knitting machine for effecting plating and reverse plating in a knitted fabric, including a circular series of independent needles, thread engaging instrumentalities between the needles respectively and individually movable in and out, thread guiding means to feed a back thread and a face thread in plating relation to the needles, a pattern disk having formations to engage and move selected instrumentalities of said series to cause them to function in effecting reverse plating, and means to render said disk ineffective without necessary stopping of the knitting operation.

31. A circular knitting machine for effecting reverse plating in a knitted fabric, including a circular series of independent needles, a rotating carrier therefor, thread engaging instrumentalities between the needles respectively and individually movable in and out, thread guiding means to feed a back thread and a face thread in plating relation to the needles, a pattern disk having formations to act selectively upon said instrumentalities to move them inward to function for reverse plating, said disk having a geared relation with the rotating needle carrier.

32. A circular knitting machine for effecting plating and reverse plating in a knitted fabric, including a circular series of independent needles, a rotatable needle carrier therefor, thread engaging instrumentalities between the needles respectively and individually movable in and out, thread guiding means to feed a back thread and a face thread in plating relation to the needles and two pattern disks geared respectively to the needle carrier and having formations to act upon said instrumentalities selectively to cause reversal in position of the threads at selected needles, whereby when loop formation by the needles is completed, reverse plating appears at predetermined wales.

33. A circular knitting machine for effecting plating and reverse plating in a knitted fabric, including a circular series of independent needles, a rotatable needle carrier therefor, thread engaging instrumentalities between the needles respectively and individually movable in and out, thread guiding means to feed a back thread and a face thread in plating relation to the needles and two pattern disks geared respectively to the needle carrier and having formations to act upon said instrumentalities selectively to cause reversal in position of the threads at selected needles, whereby when loop formation by the needles is completed, reverse plating appears at predetermined wales, the ratio of teeth upon said two disks bearing such relation to the driver therefor as to result in oppositely extending inclined stripes of reverse plating.

34. Mechanism for effecting plating and reverse plating in a knitted fabric including a series of independent needles, thread engaging instrumentalities for each needle respectively, said instrumentalities being movable individually transversely of the needle series, and selective means for acting upon said thread engaging instrumentalities to effect, when loop formation by the needles is completed, normal plating at desired needles, and reverse plating at other needles, whereby lengthwise extending stripes are produced, and whereby selected stripes are caused to slope during the knitting of the fabric.

35. Mechanism for effecting plating and reverse plating in a knitted fabric including a series of independent needles, thread engaging instrumentalities for each needle respectively, said instrumentalities being movable individually transversely of the needle series, and selective means for acting upon said thread engaging instrumentalities to effect, when loop formation by the needles is completed, normal plating at desired needles, and reverse plating at other needles, whereby lengthwise extending stripes are produced, and whereby selected stripes of reverse plating are caused to gain or to recede in a direction crosswise of the fabric.

36. Mechanism for effecting plating and reverse plating in a knitted fabric including a series of independent needles, thread engaging instrumentalities for each needle respectively, said instrumentalities being movable individually transversely of the needle series, and selective means for acting upon said thread engaging instrumentalities to effect, when loop formation by the needles is completed, normal plating at desired needles and reverse plating at other needles, whereby lengthwise extending stripes are produced, and whereby selected stripes are caused to incline or slope on the fabric according to a predetermined pattern.

37. Mechanism for effecting plating and reverse plating in a knitted fabric including a series of independent needles, thread engaging instrumentalities for each needle respectively, said instrumentalities being movable individually transversely of the needle series, and selective means for acting upon said thread engaging instrumentalities to effect, when loop formation by the needles is completed, normal plating at desired needles, and reverse plating at other needles, whereby lengthwise extending stripes are produced, and co-acting means to cause certain of said stripes to gain or advance with respect to the needles whereon they are formed and others of said stripes to lose or recede with respect to the needles whereon they are formed, whereby oppositely inclined plating stripes are produced.

38. That process of effecting striped plating in knitted fabrics consisting in feeding a back thread and a face thread to the needles so as to effect normal plating, moving selectively thread engaging instrumentalities transversely of the needle series, so as to engage a thread at any wale of the fabric at dictation of pattern control to cause relative change in position of the two threads, whereby, when loop formation by the needles is completed, reverse plating is produced at predetermined wales.

39. That process of effecting striped plating in knitted fabrics consisting in feeding a back thread and a face thread to the needles so as to effect normal plating, moving selected thread engaging instrumentalities transversely of the needle series, so as to effect a relative transverse movement of at least one of said threads with respect to the needles, with consequent relative separation of the said two threads, whereby, when loop formation by the needles is respectively completed, the back thread will appear selectively at the face of the fabric.

40. That process of effecting striped plating in knitted fabrics consisting in feeding a back thread and a face thread to the needles so as to effect normal plating, moving selected thread engaging instrumentalities transversely of the needle series, so as to effect relative separation of said two threads with a relative movement of at least one of said threads with respect to the needles, whereby, when loop formation by the needles is respectively completed, the back thread will appear selectively at the face of the fabric.

41. That process of effecting striped plating in knitted fabrics consisting in feeding a back thread and a face thread to the needles so as to effect normal plating, moving selected thread engaging instrumentalities transversely of the needle series, so as to engage and separate said two threads and thereby to effect reversal in position of said threads at selected needles, whereby, when loop formation by the needles is respectively completed, the back thread will selectively appear at the face of the fabric.

In testimony whereof, I have signed my name to this specification.

ROBERT H. LAWSON